United States Patent
Massey et al.

(10) Patent No.: US 6,637,491 B2
(45) Date of Patent: Oct. 28, 2003

(54) SEALING HEAD FOR LIDDING MACHINE

(75) Inventors: Samuel M. Massey, Joiner, AR (US); Richard Phillips, Osceola, AR (US); Jim G. Gardner, Heber Springs, AR (US); Paul D. Balentine, Fifty Six, AR (US)

(73) Assignee: Creative Foods, LLC, Osceola, AR (US)

( * ) Notice: Subject to any disclaimer, the term of this patent is extended or adjusted under 35 U.S.C. 154(b) by 168 days.

(21) Appl. No.: 09/949,478

(22) Filed: Sep. 7, 2001

(65) Prior Publication Data

US 2003/0047287 A1 Mar. 13, 2003

(51) Int. Cl.⁷ .................................................. B30B 5/00
(52) U.S. Cl. ...................... 156/581; 156/69; 156/583.1; 156/583.4
(58) Field of Search .......................... 156/69, 580, 581, 156/583.1, 583.4

(56) References Cited

U.S. PATENT DOCUMENTS

| | | | |
|---|---|---|---|
| 3,492,773 A | 2/1970 | Bergstrom | |
| 3,701,234 A | 10/1972 | Sternau | |
| 3,800,502 A | 4/1974 | Vermeulen | |
| 3,908,340 A | 9/1975 | Erhardt | |
| 4,000,029 A | * 12/1976 | Michaels | 156/510 |
| 4,216,050 A | * 8/1980 | Schmit | 156/494 |
| 4,217,156 A | 8/1980 | Slungaard et al. | |
| 4,282,699 A | 8/1981 | Embro, Jr. | |
| 4,852,328 A | 8/1989 | Culpepper et al. | |
| 5,032,213 A | 7/1991 | Thomas, Jr. | |
| 5,034,074 A | 7/1991 | Thomas, Jr. | |
| 5,106,439 A | * 4/1992 | Wellings et al. | 156/71 |
| 5,160,391 A | 11/1992 | Thomas, Jr. | |
| 5,266,150 A | * 11/1993 | Miller | 156/583.4 |
| 5,312,507 A | * 5/1994 | Miller | 156/290 |
| 5,494,552 A | * 2/1996 | Thompson | 156/476 |
| 5,776,303 A | 7/1998 | Stahlecker | |

* cited by examiner

Primary Examiner—James Sells
(74) Attorney, Agent, or Firm—J. Charles Dougherty

(57) ABSTRACT

A sealing head for a lidding machine is disclosed. The sealing head comprises a ball-and-socket joint that allows the head to provide an even, consistent seal when the orientation of the lid and container is not perfectly perpendicular with the sealing head. The sealing head also comprises an insulator portion that rests against the lid during sealing to protect the contents of the container from excessive heat. Heat is applied to the lid through a rim that extends around the circumference of the insulator portion.

19 Claims, 4 Drawing Sheets

SEALING HEAD FOR LIDDING MACHINE

BACKGROUND OF THE INVENTION

The present invention relates to mechanisms for sealing lids to containers, and in particular relates to a head assembly for sealing a peel-off lid onto a container.

Many types of food products, both liquid and solid, are packaged in containers with peel-off lids. Such containers are often designed to hold single portions of items such as condiments and toppings, and are thus referred to as "portion cups." Portion cups are commonly found in restaurants and contain such products as margarine, sour cream, and salad dressings. Solid materials that may be packaged in portion cups include ground pepper, parmesan cheese, and various other seasonings. Portion cups are available in various sizes matched to the normal portion of the materials they are designed to contain. The container itself is generally formed of a plastic material, and may be molded in many shapes, including cylindrical, rectangular, and frustoconical varieties.

Portion cups have become popular because they may be produced relatively inexpensively while offering great convenience to the consumer. Such containers may be easily opened without the need for tools or other opening devices. Generally, such containers are formed with a lip or flange extending laterally outward from the open top, to which the lid is sealed with some type of adhesive. The lid generally includes a tab or other handhold portion that extends beyond or above the lip. By gripping the tab and pulling back across the top of the lid, the consumer may easily and smoothly open the container without spilling its contents.

One of the chief difficulties encountered when applying peel-off lids to containers is the maintenance of a consistent seal strength for all such containers produced. Numerous factors may affect the seal strength for the lids of such containers, such as the temperature at which the seal is made, the amount and distribution of pressure applied to the lid during the sealing process, and the particular properties of the adhesive used. When a seal is formed that is too strong, the container becomes difficult to open, and may lead to the consumer using a knife or other potentially dangerous methods of reaching the contents inside. If the seal strength is too weak, then the container may leak during shipment or storage. Rough handling during shipment is a common problem for containers of this sort, as they are most often dropped into large boxes in groups of several hundred with no special padding or packaging to protect them from contact with other containers. If a container spills during shipment under these conditions, the entire box of product may be ruined as the contents of one or a few containers spills onto the other containers. Various environmental factors such as temperature and humidity may weaken seal strength during storage even when the seal strength was within specified tolerances at the time of manufacture. Consumers will reject a container that is not properly sealed, and the defect may reflect poorly on the food vendor that offered the product to the consumer.

A related problem may arise when containers have a lid seal that is of uneven strength at different points around the rim of the container. Orientation errors, that is, situations in which the plane of the lid and container is not perfectly perpendicular to the axis of the sealing head, are a common problem due to minor perturbations of the machinery that feeds the cups and lids through the lidding machinery prior to the sealing step. These orientation errors can lead to seals of uneven strength, since more pressure will typically be applied to the "higher" side of the lid and container, that is, the side of the lid and container that are nearer the sealing head before it is lowered. Seals that are of uneven strength are more likely to result in containers that leak. Worse still, such containers will be difficult for consumers to open without spilling the contents inside. A consumer may, for example, pull with great force if the lid seal strength is high near the pull tab; if the seal strength diminishes at the other side of the container, the excessive force being applied by the consumer to begin the lid removal operation may cause the consumer to drop or tip the container as the lid pulls away.

Another problem often encountered in sealing container lids is that the heat required to form the seal may damage or destroy the product within the container. Food items, whether liquid or solid, may suffer deterioration of their taste, color, or consistency when exposed to excessive heat during the sealing process, resulting in a product that will be rejected by the consumer. Even where excessive heat does not damage the food product within the container, it may lower the shelf life of the product, which results in greater cost to the vendor who must dispose of any unused containers at the expiration date. Also, excessive heating of liquid materials within the container may result in the release of steam, which will increase the internal pressure within the container and thereby increase the chance that the lid seal will not remain intact until the product reaches the consumer.

Various sealing mechanisms have been developed in an attempt to solve these problems inherent in the sealing of lids to containers. U.S. Pat. No. 5,032,213 to Thomas, Jr. discloses a method for melting two thermal plastic parts together using a sealing head that includes a cool clamp and a hot seal head along the edges of the cool clamp. Prior to sealing, the cool clamp portion of the sealing head assembly is lowered into place to hold the lid onto the container. The heated seal head, which circumscribes the cool clamp, is then lowered into contact with the edges of the lid to melt the edges of the lid and the rim of the container together, thereby forming a seal. Because this sealing method requires the additional step of lowering the cooling clamp into place before heat sealing may take place, it is relatively slow compared to other methods, and therefore increases the cost of production. This method is further slowed by the fact that retraction of the cool clamp quickly will result in a partial vacuum in the space enclosed by the lidded container, cool clamp, and sealing head. This partial vacuum may weaken the lid seal or actually unseal the lid, so the cool clamp must be withdrawn slowly to avoid this result, further slowing the manufacturing process.

U.S. Pat. No. 4,852,328 to Culpepper et al. discloses an apparatus for sealing a container using a sealing head that incorporates an electrical heater element. At the base of the sealing head is a plate with a raised rim extending downwardly. The plate is in direct contact with the heating element, so that the plate is heated thereby. A lid may be sealed to a container by lowering the sealing head such that the raised rim is pressed against the top of the lid directly above the edge of the container. The portion of the plate within the raised rim does not come into direct contact with the lid of the container; thus there is nothing to hold the lid in place on the container during sealing except the relatively small surface area of the raised rim.

U.S. Pat. No. 3,492,773 to Bergstrom discloses a method of vacuum packaging that includes the use of a heated sealing head. The sealing head is formed with a flange extending downwardly toward the package so that only the flange portion contacts the edges of the lid as the lid is sealed to the container.

U.S. Pat. No. 3,908,340 to Erhardt discloses an apparatus for applying lids to containers, which incorporates a floating sealing head. The sealing surface is loosely connected to the remainder of the sealing head assembly by bolts, and is biased away from the sealing head assembly by springs riding on those bolts. The sealing surface thus has limited vertical movement with respect to the sealing head assembly.

None of these prior art devices provides a complete solution to the lidding requirements discussed above. The desired sealing mechanism would hold the lid firmly in place on the container during the sealing process; prevent excessive heating of the contents of the container during sealing; and automatically adjust to minor errors in the alignment or orientation of the lid and container with respect to the sealing head such that a consistent, even seal may still be formed. The limitations of the prior art are overcome by the present invention, and the aforementioned desired qualities are achieved with the present invention, as described below.

BRIEF SUMMARY OF THE INVENTION

The present invention is directed to a sealing head that both protects the contents of a container from excessive heating during the sealing process and automatically adjusts to the orientation of the lid and container to provide an even lid seal strength. The sealing head comprises a ball-and-socket joint between the mounting body and the heating element. The ball portion is mounted to a stump, and a ring clamp attached to the heating element provides the socket. The ball-and-socket joint allows the heating element to automatically adjust to the orientation of the lid and container to form a consistent, even seal. If, for example, the lid and container are slightly tilted with respect to the plane of the sealing head, the ball-and-socket joint will automatically adjust the orientation of the heating element such that it matches that of the lid as the sealing head is pressed against the lid. The ball-and-socket joint allows the sealing head heating element to universally adjust its orientation within a certain spherical range so that the direction in which the lid and container are tilted is unimportant. A locking collar attached to the ring clamp holds the ball portion of the stump in place within the socket of the ring clamp.

In addition, the stump that carries the ball portion of the present invention is spring-loaded, so that the exact vertical positioning of the sealing head with respect to the lid and container is not critical. If, for example, the sealing head extends slightly lower than intended during operation, the spring within the sealing head will absorb the additional force between the sealing head and the lid, thereby preventing damage to the lidding machinery if the sealing head were pressed directly down onto the lid and container feeding mechanism without compensation. A snap ring at the top of the stump prevents the spring from forcing the stump and ring clamp completely apart by limiting the travel of the stump. Guide rods fitted between the mounting body and the ring clamp to prevent over travel of the stump upward, thereby preventing damage to the sealing head if for some reason the sealing head should be pressed down too far.

The contents of the container during lidding are protected by an insulated disc that is attached at the bottom end of the sealing head. This insulated disc makes direct contact with the lid during sealing to both hold the lid and place and to protect the contents within the container from the heat of the sealing head. A heating element rim extends circumferentially around the insulated disc and provides the heat necessary to seal the lid into place on the container. The heating element rim only contacts the lid along a circle that lies directly above the rim of the container, so that only the portion of the lid that will be sealed to the container is significantly heated. The insulating disc is attached to a central flat portion of the heating element within the heating element rim. Additionally, an insulating ring may be fitted between the heating element and the ring clamp to prevent excessive heating of the ring clamp.

The present invention improves on the prior art in significant ways. The insulating disc of the present invention allows the sealing head to hold the lid in place on the container during sealing, thereby reducing the chance that the lid could be inadvertently bumped or misaligned during the sealing process. Also, since the sealing head of the present invention has an insulating disc and heating element that do not move separately, there is no concern about the creation of a vacuum in the space above the lid so that the lid seal could be damaged shortly after the sealing step takes place.

The ball-and-disc joint of the sealing head of the present invention allows universal travel so that any minor orientation errors between the sealing head and the lid and container may be adjusted for automatically as the sealing takes place. The result is a seal between the lid and container that is consistent and uniform despite minor orientation errors.

It is therefore an object of the present invention to provide for a sealing head in a lidding machine that seals a lid onto a container without exposing the contents of the container to excessive heat.

It is a further object of the present invention to provide for a sealing head in a lidding machine that will automatically adjust to compensate for minor differences in orientation between the sealing head and the lid and container to be sealed.

It is also an object of the present invention to provide for a sealing head in a lidding machine that will automatically adjust for orientation errors no matter in what direction the errors occur.

These and other features, objects and advantages of the present invention will become better understood from a consideration of the following detailed description of the preferred embodiments and appended claims in conjunction with the drawings as described following:

DETAILED DESCRIPTION OF THE INVENTION

Figure 1:
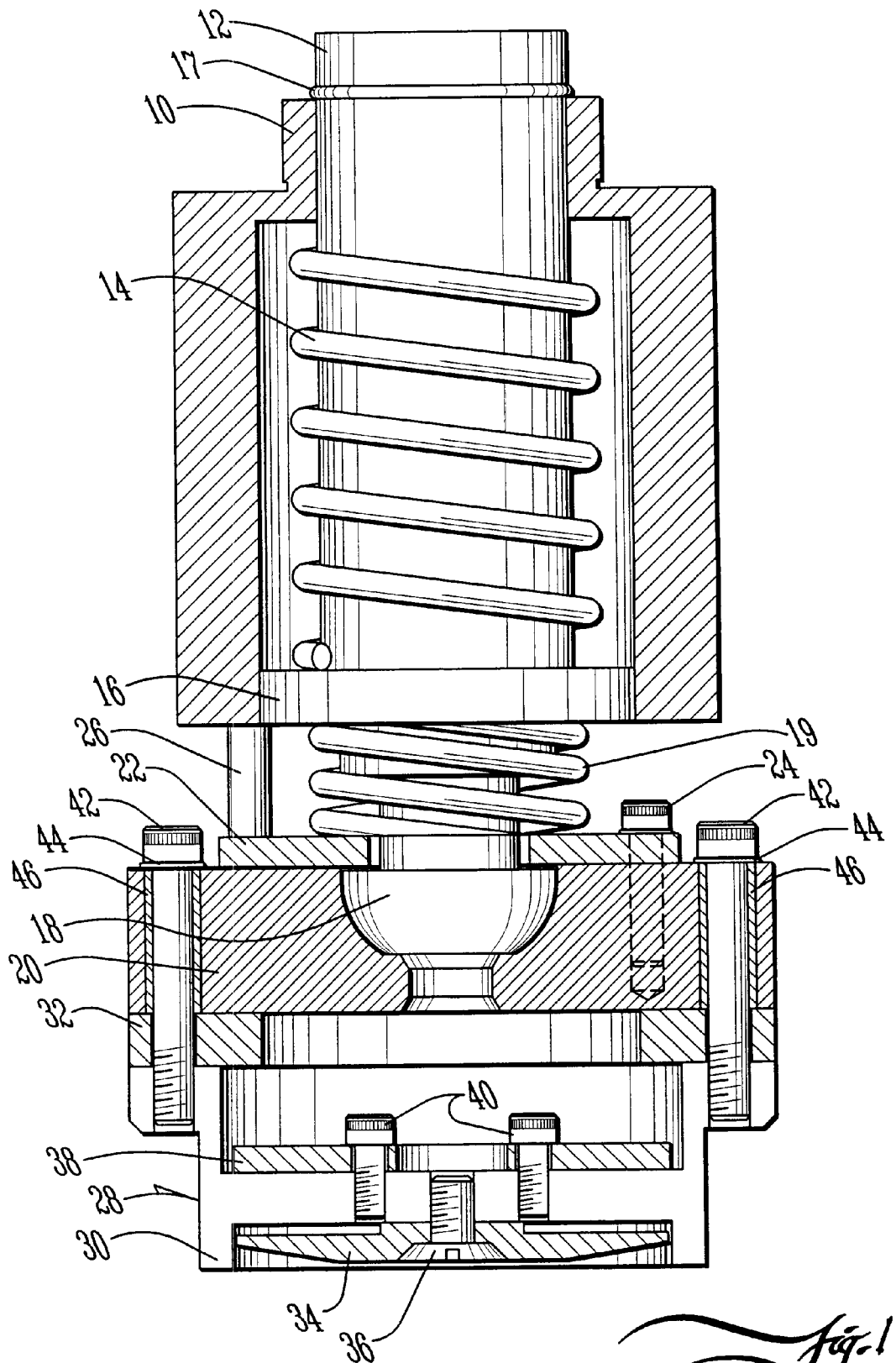
FIG. 1 is a cut-away view of a preferred embodiment of the present invention.
Figure 2:
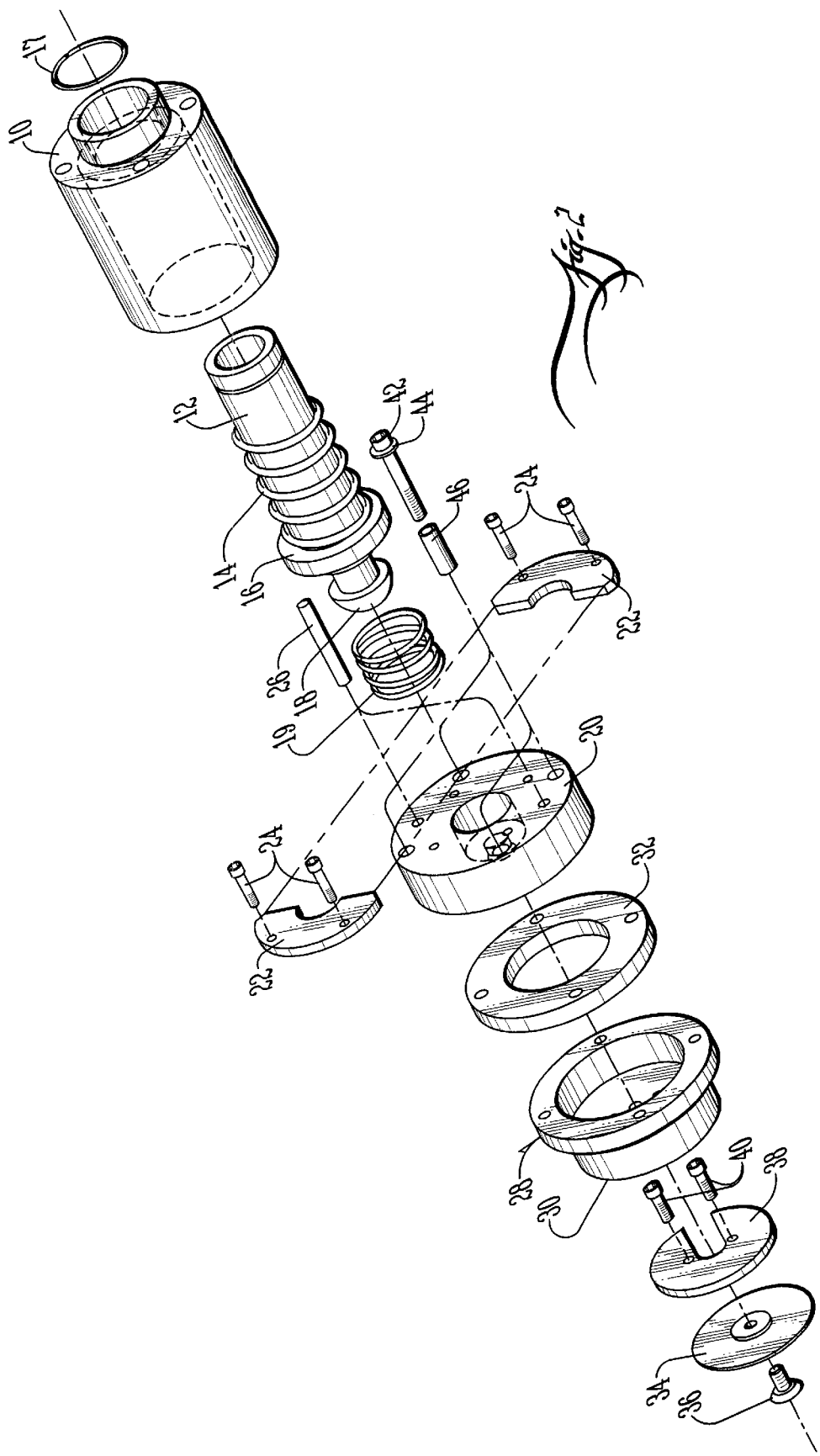
FIG. 2 is an exploded view of a preferred embodiment of the present invention.

With reference to FIGS. 1 and 2, the preferred embodiment of the present invention may be described. Mounting body 10 provides a mounting point for the sealing head within a lidding machine (not shown). Mounting body 10 also provides a housing for stump 12. Stump 12 is fitted coaxially within mounting body 10 such that stump 12 may move vertically within mounting body 10. Spring 14 is coiled about stump 12 and within mounting body 10. Spring 14 rests against stump lip 16 at its lower end and against mounting body 10 at its upper end. The movement of stump 12 upward within mounting body 10 thus compresses spring 14. Snap ring 17 fits within a groove at the upper end of stump 12 and stops the downward travel of stump 12 with respect to mounting body 10, thereby preventing spring 14 from forcing stump 12 out of the bottom end of mounting body 10.

Ball 18 at the lower end of stump 12 fits into ring clamp 20 and is held in place by locking collar halves 22. Locking collar halves 22 are attached to ring clamp 20 with locking collar screws 24. Guide rods 26 fit into holes bored into the lower edge of mounting body 10 and the top side of ring clamp 20. While in the preferred embodiment two guide rods 26 are used, any number of guide rods 26 may be used in alternative embodiments of the invention. In addition, the invention may be practiced without guide rods 26. Lower spring 19 is fitted around stump 12 between the top side of locking collar halves 22 and the bottom side of stump lip 16. Lower spring 19 acts to bias ring clamp 20 into a parallel plane with stump lip 16.

Heating element 28 is attached below ring clamp 20. In a preferred embodiment of the invention, insulator ring 32 is sandwiched between ring clamp 20 and heating element 28. Insulator ring 32 thereby insulates ring clamp 20 from the heat that is generated at heating element 28. Insulator disc 34 is fitted against the lower side of heating element 28 within heating element rim 30. Insulator disc 34 is held in place against heating element 28 by insulator disc screw 36. Preferably, insulator disc 34 is not perfectly flat on its lower face, but is instead beveled slightly along its periphery to ensure firm contact between heating element rim 30 and the lid to be sealed. Open clamp 38 fits into the top side of heating element 28 and is connected to heating element 28 by open clamp screws 40. Heating element 28 and open clamp 38 are connected to an electrical heat source in the lidding machine (not shown) in a fashion as is well known in the art in order to heat heating element 28.

Ring clamp 20 is connected to heating element 30 through insulator ring 32 by ring clamp screws 42. Ring clamp washers 44 ride against ring clamp 20 on ring clamp screws 42. Spacers 46 fit around ring clamp screws 42 and through the holes in ring clamp 20 to accommodate ring clamp screws 42.

Figure 3:
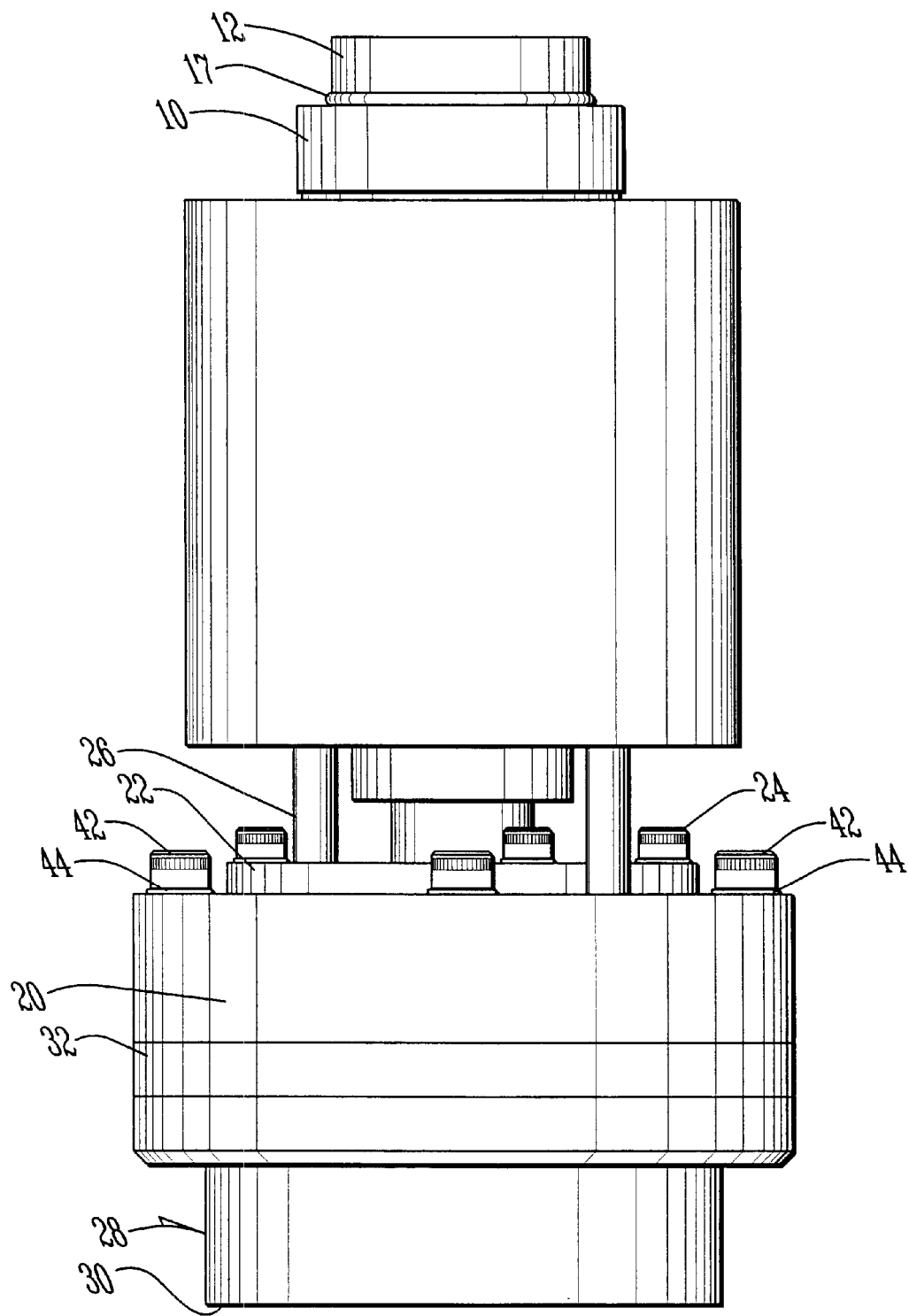
FIG. 3 is an elevational view of a preferred embodiment of the present invention in the raised position.
Figure 4:
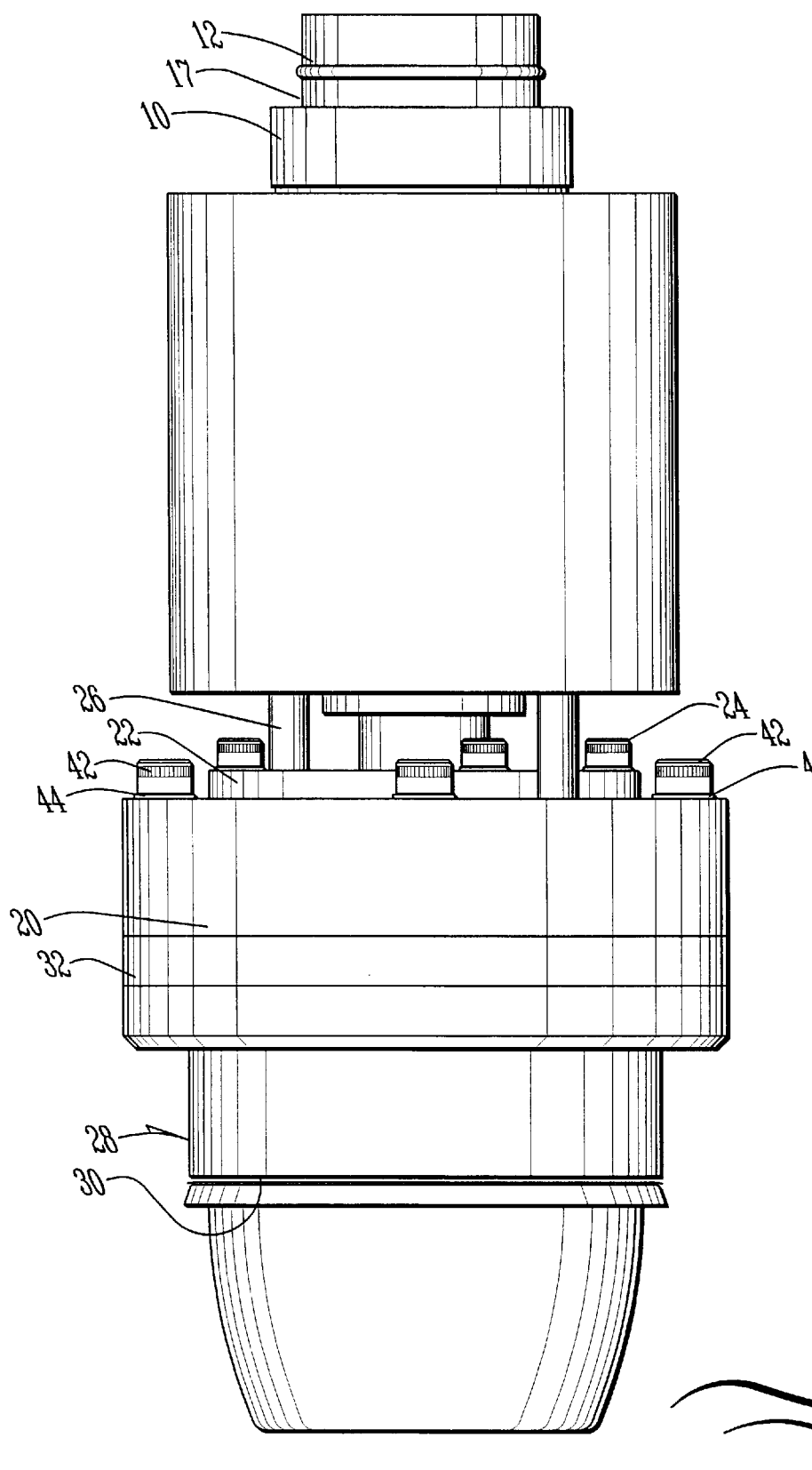
FIG. 4 is an elevational view of a preferred embodiment of the invention in the lowered position, during the process of sealing a lid onto a container.

The method of operation for the preferred embodiment of the present invention may now be described with reference to FIGS. 3 and 4. The sealing head is connected to a lidding machine through mounting body 10. When in the raised position, spring 14 causes stump 12 to extend downward to the limit of its travel, such that snap ring 17 is in contact with the top of mounting body 10. In this position, heating element 28 is at its lowest possible position. Once a container and lid are aligned below the sealing head, the head is lowered as shown in FIG. 4. Contact with the lid and container causes spring 14 to compress as stump 12 is forced upward through mounting body 10. Thus spring 14 moderates the downward pressure applied to a lid and container to prevent damage to the lid and container from excessive pressure. Guide rods 26 prevent overcompression of spring 14, so that the sealing head is not damaged by, for example, mounting body 10 coming into contact with the heads of locking collar screws 24 as mounting body 10 is forced downward.

While the sealing head is in contact with the lid and container, heat applied by heating element 28 is transferred to the portion of the lid in contact with heating element rim 30. Since this portion of the lid is directly above the rim of the container, the heat from heating element rim 30 causes a seal to form between the lid and the container. The type of adhesive used to form a bond between the lid and container can be any one of many common heat-activated and pressure-activated adhesive types as are well known in the art. Insulator disc 34 protects the central portion of the lid from the heat of heating element 28, and thereby prevents excessive heating of the contents of the container.

The ball-and-joint structure of the preferred embodiment of the present invention makes it possible to form a consistent, even seal even when the orientation of the lid and container is not perfectly perpendicular with the axis of the sealing head. As shown in FIG. 4, the swivel of ball 18 within the socket of ring clamp 20 allows the sealing head to automatically adjust to minor errors in orientation with respect to the lid and container. Because the pressure exerted by the lowering of mounting body 10 downward is spread out relatively evenly over heating element rim 30 and the flat portion of insulator disc 34, the seal formed between the lid and the container will be even despite the fact that some points along the joint are higher than others with respect to the sealing head. Pressure applied on the sealing head during operation overcomes the bias of spring 19, thereby allowing ball 18 to swivel and adjust as needed to provide a firm seal.

The present invention has been described with reference to certain preferred and alternative embodiments that are intended to be exemplary only and not limiting to the full scope of the present invention as set forth in the appended claims.

What is claimed is:

1. A sealing head, comprising:
   (a) a heating element, wherein said heating element comprises a contact lip adapted to press against the portion of a lid that lies above the rim of a container to which the lid is to be sealed; and
   (b) an insulator, wherein said insulator is mounted with respect to said heating element such that said insulator covers the center portion of the lid when said heating element contact lip presses against the portion of the lid that lies above the rim of the container to which the lid is to be sealed, and wherein said insulator is rigidly fastened into position with respect to said heating element.

2. The sealing head of claim 1, wherein said heating element further comprises a central disc, and wherein said insulator is mounted against said heating element central disc.

3. The sealing head of claim 2, further comprising a ring clamp attached to said heating element.

4. The sealing head of claim 3, further comprising:
   (a) a mounting body; and
   (b) a stump moveably attached to said mounting body, wherein said ring clamp is adapted to receive said stump in ball-and-socket joint fashion.

5. The sealing head of claim 4, further comprising:
   (a) a resilient member biasing said stump downward away from said mounting body; and
   (b) a locking collar mounted to said ring clamp coaxially with said stump, wherein said stump is rotatably held in position by said locking collar with respect to said ring clamp.

6. The sealing head of claim 5, wherein said resilient member is a spring fitted coaxially and circumferentially around said stump.

7. The sealing head of claim 6, further comprising a plurality of guide rods extending between said mounting body and said ring clamp.

8. The sealing head of claim 7, further comprising an insulator ring between said heating element and said ring clamp.

9. A sealing head, comprising:
(a) a mounting body
(b) a stump moveably attached to said mounting body;
(c) a ring clamp, wherein said ring clamp is adapted to receive said stump in ball-and-socket joint fashion;
(d) a resilient member biasing said stump downward away from said mounting body; and
(e) a locking collar mounted to said ring clamp coaxially with said stump, wherein said stump is rotatably held in position by said locking collar with respect to said ring clamp.

10. The sealing head of claim 9, wherein said resilient member is a spring fitted coaxially and circumferentially around said stump.

11. The sealing head of claim 10, further comprising a plurality of guide rods extending between said mounting body and said ring clamp.

12. The sealing head of claim 11, further comprising:
(a) a heating element attached to said ring clamp, wherein said heating element comprises a contact lip adapted to press against the portion of a lid that lies above the rim of a container to which the lid is to be sealed; and
(b) an insulator, wherein said insulator is mounted with respect to said heating element such that said insulator covers the center portion of the lid when said heating element contact lip presses against the portion of the lid that lies above the rim of the container to which the lid is to be sealed, and wherein said insulator is rigidly fastened into position with respect to said heating element.

13. The sealing head of claim 12, wherein said heating element further comprises a central disc, and wherein said insulator is mounted against said heating element central disc.

14. The sealing head of claim 13, further comprising an insulator ring between said heating element and said ring clamp.

15. The sealing head of claim 9, further comprising:
(a) a heating element attached to said ring clamp, wherein said heating element comprises a contact lip adapted to press against the portion of a lid that lies above the rim of a container to which the lid is to be sealed; and
(b) an insulator, wherein said insulator is mounted with respect to said heating element such that said insulator covers the center portion of the lid when said heating element contact lip presses against the portion of the lid that lies above the rim of the container to which the lid is to be sealed, and wherein said insulator is rigidly fastened into position with respect to said heating element.

16. The sealing head of claim 15, wherein said heating element further comprises a central disc, and wherein said insulator is mounted against said heating element central disc.

17. The sealing head of claim 16, further comprising:
(a) a resilient member biasing said stump downward away from said mounting body; and
(b) a locking collar mounted to said ring clamp coaxially with said stump, wherein said stump is rotatably held in position by said locking collar with respect to said ring clamp.

18. The sealing head of claim 17, wherein said resilient member is a spring fitted coaxially and circumferentially around said stump.

19. The sealing head of claim 18, further comprising a plurality of guide rods extending between said mounting body and said ring clamp.

* * * * *